United States Patent [19]

Korematsu

[11] 4,180,941

[45] Jan. 1, 1980

[54] BEAN SPROUTER

[76] Inventor: Joe Korematsu, 14111 Washington Ave., San Leandro, Calif. 94578

[21] Appl. No.: 854,971

[22] Filed: Nov. 28, 1977

[51] Int. Cl.² ............................................. A01C 1/00
[52] U.S. Cl. ......................................... 47/14; 47/61
[58] Field of Search ................... 47/14, 15, 16, 66, 79, 47/80, 81, 59, 60, 61, 62, 63, 64, 65; 210/464, 474, 489, 477

[56] References Cited

U.S. PATENT DOCUMENTS

| 309,132 | 12/1884 | Coldewe et al. | 47/14 |
| 2,141,478 | 12/1938 | Lund | 47/60 |
| 2,431,063 | 11/1947 | McGahey | 47/14 |
| 2,738,621 | 3/1956 | Abbrecht | 47/79 |
| 2,810,988 | 10/1957 | Chin | 47/61 |
| 2,889,049 | 6/1959 | Hauser | 210/477 X |
| 2,983,076 | 5/1961 | Merrill | 47/59 |
| 3,323,253 | 6/1967 | Robins | 47/62 |
| 3,643,376 | 2/1972 | Poindexter et al. | 47/61 |
| 3,768,201 | 10/1973 | Yoo | 47/61 X |
| 4,037,359 | 7/1977 | Peng et al. | 47/14 |

FOREIGN PATENT DOCUMENTS

| 173494 | 3/1905 | Fed. Rep. of Germany | 47/14 |
| 2544699 | 10/1976 | Fed. Rep. of Germany | 47/14 |
| 22322 | of 1913 | United Kingdom | 47/16 |
| 659846 | 10/1951 | United Kingdom | 47/79 |
| 1459193 | 12/1976 | United Kingdom | 47/66 |

*Primary Examiner*—Edgar S. Burr
*Assistant Examiner*—James R. Feyrer
*Attorney, Agent, or Firm*—Bielen and Peterson

[57] ABSTRACT

A bean sprouter for convenient sprouting of beans, seeds, and the like for food preparation, the sprouter is constructed with a cannister having a water collection area in the bottom; a perforated container for beans to be sprouted that is supportable in the cannister above the water collector area, the container including a disposable filter paper casing for the beans; a top with a water inlet dish perforated to distribute water poured into the inlet dish over the bean container; a ventilation system; and an indicator device with a support base that rests on the beans in the bean container, and a vertical flag which is projectable through the top and is elevated as the beans in the container expand.

11 Claims, 5 Drawing Figures

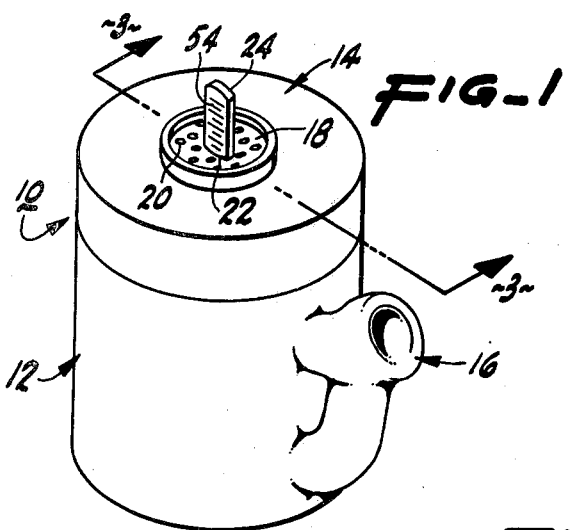
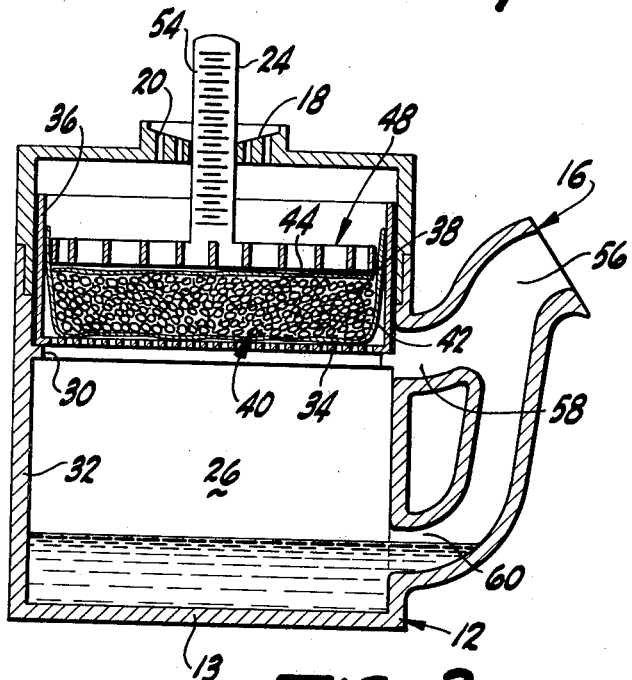
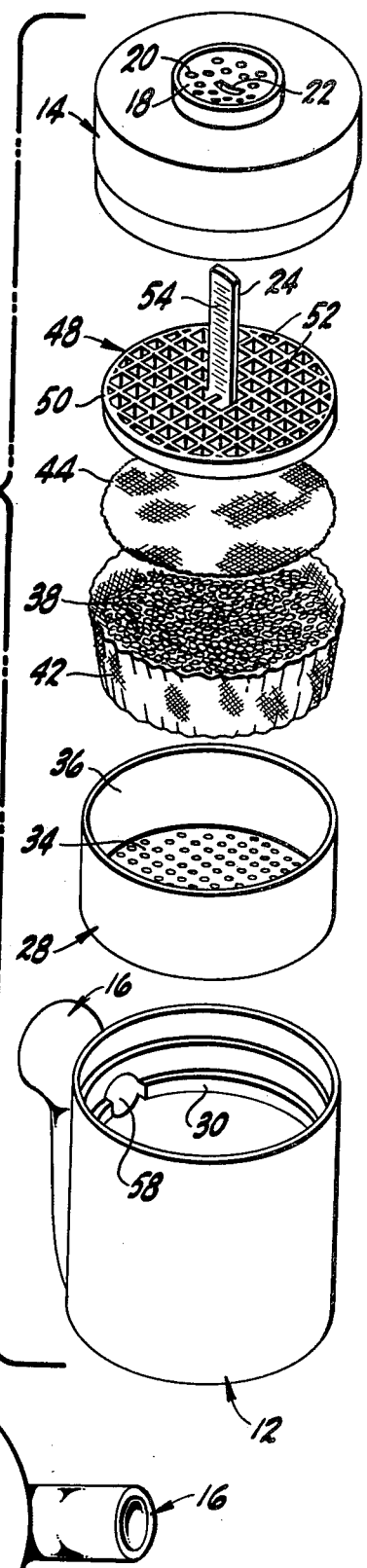
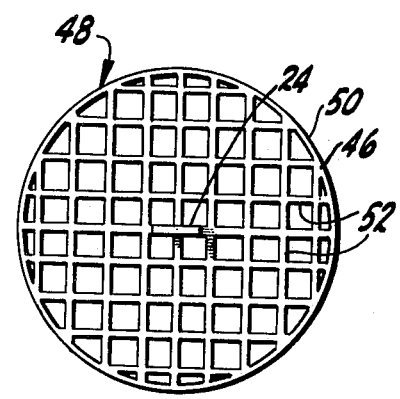
FIG-1
FIG-2
FIG-3
FIG-5
FIG-4

BEAN SPROUTER

BACKGROUND OF THE INVENTION

This invention relates to a device for convenient sprouting of beans and other seed-type sprouts used in food preparation. Specifically, the device comprises a self contained sprouter designed for convenient use in the home, and in other environment where limited on location production of sprouts are desired such as in restaurants, specialty food stores and the like. While the preferred embodiment is of a size that is ideal for home use and for using presently available filtration supplies, the basic design can be enlarged where increased production is desired.

While the device is usable for sprouting of a variety of beans and seeds such as mung beans, alfalfa seeds, soybeans, peas, corn and certain cereals, for simplicity of description, the device is termed a bean sprouter and the following process description is for mung beans as an example of the manner of use. Minor variations may be necessary for the particular type of sprouts because of considerations such as germination time, expansion factors and other conditions peculiar to the particular sprout.

Producing bean sprouts from mung beans is a popular means of obtaining a fresh, vegetable or green substitute from a dried bean that can be stored in quantity and used in measured amounts as desired. As described in a U.S. Department of Agriculture publication entitled, Bean Sprouts by H. M. Butterfield, mung beans in the past have been prepared for sprouting by soaking in water at 80° F. which is cooled to 70° F. and kept for a period of about ten (10) hours. In a container having good drainage such as a fern pot or collander, it is suggested that two layers of cheesecloth be placed in the bottom of the container. The container should be sterilized with hot water or steam before each use to prevent possible damping off of the seedlings. The cheesecloth should also be washed thoroughly and sterilized before each use.

The soaked beans are piled on the cheesecloth to a depth of not more than two (2) inches. The soaked beans are covered with additional layers of cheesecloth and covered to provide a dark humid environment.

After wetting the beans and cheesecloth with lukewarm water, (about 70° F.), additional lukewarm water is poured over the cheesecloth and beans every four hours. Good ventilation and drainage is necessary. If the container is enclosed in part, the container should be tilted periodically to allow carbon dioxide to escape from the bottom and provide thorough drainage.

The sprouts increase to over six times the size of the original dried beans, and one pound of mung beans will produce about eight pounds of sprouts. The bean sprouts will be ready for washing and meal preparation in three to five days when the sprouts are from 1 to 2½ inches in length.

The device described herein adopts certain of these sprouting principals, but is devised to provide greater convenience to users, many of whom would abandon sprouting techniques without a simple virtually foolproof system. The device described in brief in the following summary and in greater detail thereafter, allows for a convenient and simple manner of sprouting beans that will appeal to the unsophisticated user.

SUMMARY OF THE INVENTION

The device of this invention comprises a compact unit specifically devised for efficient and convenient sprouting. Essentially, the device is an enclosed cannister attractively designed for counter top placement and constructed with utilitarian emphasis. The cannister is provided with a top having a funnel-like collector disk perforated to distribute water poured in the dish over the cross section of the cannister. Within the cannister is an elevated platform for support of a perforated or screened container for the beans. The container is designed for use with a sterilized filter paper encasement for the beans, which in the preferred embodiment comprises a cup-type paper filter into which the beans are placed, and a flat circular paper filter which is placed over the beans. The paper filters are disposable, eliminating the inconvenience of cutting and washing cheesecloth. Alternately, the beans can be sold as a pre-encased filter paper package for added convenience eliminating measurement and added handling.

The bottom of the cannister below the bean container comprises a water collection area for the water that is periodically poured over the beans.

For determining the progress of the sprouting, an indicator means is provided which comprises a vertical flag that protrudes through the top of the cannister which is connected to a base that rests on the beans and rises as the bean sprouts expand. The indicator is marked with indicia which is codeable to the type of sprout and quantity used.

The bean sprouter includes a ventilation system which in the preferred embodiment comprises a spout, which provides the functions of ventilating the water collection area of the cannister, providing a means for pouring excess water out of the cannister if desired which also expunges collected Carbon Dioxide, and providing a handle for the cannister.

BRIEF DESCRIPTION OF THE DRAWINGS

FIG. 1 is a perspective view of the bean sprouter.

FIG. 2 is an exploded view of the bean sprouter of FIG. 1.

FIG. 3 is a cross sectional view taken on the lines 3—3 in FIG. 1.

FIG. 4 is a top view of the bean sprouter of FIG. 1.

FIG. 5 is a top view or an indicator component of the bean sprouter of FIG. 1.

DETAILED DESCRIPTION OF THE PREFERRED EMBODIMENT

Referring to the perspective view of FIG. 1, the assembled bean sprouter is shown and designated generally by the reference numeral 10. A bean sprouter 10 is constructed with a cylindrical cannister 12 having a tight fitting top 14. Fixed to the side of the cannister is a pour spout 16 which is used both for pouring excess water from the container and providing ventilation to the inside of the cannister to minimize the accumulation of carbon dioxide. Centrally located in the top 14 of the cannister, is a concave dish 18 having a plurality of holes 20 which pass through the top of the cannister. Projecting through a slot 22 in the center of the dish 18 is an indicator flag 24 described in greater detail hereafter. Referring now to FIGS. 2 and 3, the internal construction of the bean sprouter is illustrated. The lower portion of the cylindrical cannister 12 comprises a water collection area 26. The cannister is fabricated from a material that is substantially light impervious to provide a dark environment for the beans. A dark but partially transmissible material may, however, be advantageous to check water levels. This collection area stores water that drains down through the cannister after being poured into the funnel-like collection dish on the cover top 14 for the cannister 12.

Above the water collection area is a bean sprout container 28 which is supported on an annular bridge 30 projecting from the inside wall 32 of the cannister. The bean sprout container 28 has a perforated bottom 34 to allow water to freely pass through the container. Alternately, a screen or other support through which water will pass can be substituted for the perforated bottom 34. The container has a cylindrical side wall 36 of sufficient height to hold an adequate supply of sprouts.

Bean sprouts, illustrated in FIG. 3 and designated by the reference numeral 38, are encased within a filter paper enclosure 40. In the preferred embodiment, the filter paper enclosure 40 comprises a cup-type paper filter 42 into which the beans are placed and a disk-type paper filter 44 which covers the beans.

Lightly resting on top of the disk-type paper filter 44 is the web-like base 46 of an indicator device 48. The construction of the indicator device 48 is also shown in FIG. 5, wherein the web-like base comprises a lightweight plastic ring 50 with cross supports 52. Projecting vertically from the base 46 is the indicator flag 24. As shown in FIG. 3, the indicator flag includes indicia markings 54 for determining the elevation of the indicator flag 24 above the funnel-like collector dish 18.

As illustrated in FIG. 3, the pour spout 16 has a bifurcated passage 56 with an upper portion 58 communicating with the upper portion of the cannister 12 and the lower portion 60 communicating with the lower portion of the cannister. In this manner, a substantial degree of ventilation is provided even when the water level in the water collection area blocks the lower portion of the bifurcated passage 60.

The exploded of FIG. 3 provides a clear illustration of the manner of assembling the bean sprouter for use. In this respect, the bean sprout container 28 is dropped in place in the cannister 12. The cup-type paper filter 42 is nestled within the container 28 for placing the presoaked beans into the container supported cup-like filter. The beans are then covered with the disk-type paper filter 44 and the indicator device 48 is lightly rested on top of this filter. Finally, the cylinder cannister top 14 is carefully placed over the cannister such that the indicator flag 24 projects up through the slot 22 in the cannister top. The cannister top 14 has a beveled portion 62 which inserts into a rimmed portion 64 on the upper portion of the inside wall 32 of the cannister 12 as shown also in FIG. 3.

In use, beans can be first soaked in the bottom of the cannister for the recommended period. After soaking, the water is drained and the beans transferred to the bean container in which the cup-type filter is placed. The flat circular paper filter is placed on top of the beans and the indicator on top of the flat paper filter. The top of the cannister as mentioned above, is finally installed with care to allow the flag of the indicator to project through a slot in the top. Lukewarm water is poured through the dish to wet the filter papers and encased beans. After periodic water and occassional tipping of the cannister to drain excess water and purge carbon dioxide, the beans will sprout elevating the indicator. After a predetermined elevation of the indicator, observed by the height of the flag, the sprouts are removed. For mung beans, the removal of husks or shells can easily be accomplished by dumping the beans into the cannister filled with water. The bean sprouts will suspend themselves in a partially floating condition. The shells will either sink or float to the surface.

The floating shells can be poured off and the sprouts removed by grasping and removing by hand, or the sprouts can be simply grasped and pulled up through the shells floating on the surface. The sprouts are shaken to remove excess water and are ready for use.

What is claimed is:

1. A sprouter for beans and the like comprising:
   a. cannister having a water tight bottom and a water collection area at the bottom of said cannister;
   b. a cannister for beans and the like having a water draining bottom allowing water to pass through said container for accumulation and storage at the bottom of the water collection area;
   c. support means for supporting said container on said cannister above said water collection area;
   d. a top, covering said bean container for providing a dark environment for said beans in said container, said top having a concave dish portion with a plurality of uniformly spaced, open, water-passage holes in said dish portion passing through said top, said dish portion comprising a funnel-like temporary water collector for distributing water poured into said dish portion through said holes and over said bean container; and
   e. a ventilation means comprising at least one air passage through said cannister from the water collection area to the atmosphere, said air passage being located below the bottom of said bean container for venting accumulating carbon dioxide in the water collection area to the atmosphere.

2. The sprouter of claim 1 wherein said ventilation means further comprises a spout having a passage leading upward from said water collection area, said spout being adapted further for pouring excess water from said water collection area of said cannister.

3. The sprouter of claim 2 wherein said spout passage is bifurcated, having a first passage portion entering said cannister at the top of said water collection area and a second passage portion entering said cannister therein proximate the bottom of said water collection area.

4. The sprouter of claim 3 wherein said spout has a configuration in the form of a handle.

5. The sprouter of claim 1 wherein said sprouter includes further, a disposable paper filter means arrangeable in said container substantially encasing beans or the like in said container.

6. The sprouter of claim 5 wherein said paper filter means comprises a first cup-type paper filter nestable in said container and a second flat disk typer paper filter adapted to substantially cover said first paper filter, the beans and the like being locatable between said filter papers and substantially enclosed thereby.

7. The sprouter of claim 5 wherein said paper filter means comprises a packet encasing a predetermined amount of beans and the like.

8. The sprouter of claim 1 comprising further an indicator means for determining when beans and the like have sprouted and are ready for removal from the sprouter.

9. The sprouter of claim 8 wherein said indicator means comprises a lightweight base supportable over the top of beans or the like contained in said container and a flag means connected to said base for providing visual inspection of the position of said indicator means.

10. The sprouter of claim 8 wherein said flag means extends up through said cover means.

11. The sprouter of claim 1 having further, ventilation means for venting said water collection area, a disposable paper filler means arrangeable in said container substantially encasing beans or the like in said container, and an indicator means for determining when beans and the like have sprouted and are ready for removal from the sprouter.

* * * * *